I*

(12) United States Patent
Tsubone

(10) Patent No.: US 9,959,084 B2
(45) Date of Patent: May 1, 2018

(54) COMMUNICATION TERMINAL, COMMUNICATION SYSTEM, COMMUNICATION CONTROL METHOD, AND RECORDING MEDIUM

(71) Applicant: Shuhei Tsubone, Tokyo (JP)

(72) Inventor: Shuhei Tsubone, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days. days.

(21) Appl. No.: 15/366,094

(22) Filed: Dec. 1, 2016

(65) Prior Publication Data
US 2017/0153865 A1 Jun. 1, 2017

(30) Foreign Application Priority Data
Dec. 1, 2015 (JP) .................... 2015-234557

(51) Int. Cl.
*H04N 7/14* (2006.01)
*G06F 3/14* (2006.01)
(Continued)

(52) U.S. Cl.
CPC .......... *G06F 3/1454* (2013.01); *G06T 11/203* (2013.01); *G06T 11/60* (2013.01); *H04N 7/15* (2013.01); *G06T 2200/24* (2013.01)

(58) Field of Classification Search
CPC .... G06F 3/03545; G06F 3/041; G06F 3/0488; G06F 3/14; G06F 3/0481; G06F 3/04883;
(Continued)

(56) References Cited

U.S. PATENT DOCUMENTS

2003/0077561 A1 4/2003 Alsop et al.
2008/0232695 A1* 9/2008 Noda ................ G06F 17/30265
382/224
(Continued)

FOREIGN PATENT DOCUMENTS

EP 2 654 240 A1 10/2013
JP 2012-58799 A 3/2012
JP 2015-070345 4/2015

OTHER PUBLICATIONS

U.S. Appl. No. 15/270,235, filed Sep. 20, 2016.
U.S. Appl. No. 15/274,263, filed Sep. 23, 2016.

*Primary Examiner* — Binh K Tieu
(74) *Attorney, Agent, or Firm* — Oblon, McClelland, Maier & Neustadt, L.L.P.

(57) ABSTRACT

A communication terminal displays an image having a plurality of image layers, being shared with a first communication terminal and a second communication terminal. In response to a user input for changing appearance of a first image layer of the image, the communication terminal stores information reflecting the change caused by the user input to the first image layer in a memory, and generates an updated image having the first image layer that reflects the change caused by the user input. The communication terminal transmits the information reflecting the change to the first image layer to the first communication terminal to cause the first communication terminal to generate and display the updated image. The communication terminal transmits the updated image having the first image layer that reflects the change to the second communication terminal to cause the second communication terminal to store the updated image.

18 Claims, 15 Drawing Sheets

(51) Int. Cl.
*G06T 11/60* (2006.01)
*G06T 11/20* (2006.01)
*H04N 7/15* (2006.01)

(58) Field of Classification Search
CPC .... G06F 1/1616; G06F 1/1647; G06F 1/1656; G06F 1/1686; G06F 1/1692; G06F 3/0482; G06F 3/0483; G06F 3/04886; G06F 1/1643; G09G 5/377
USPC ......... 348/14.01, 14.03, 14.07, 14.08, 14.12; 345/619, 629, 630, 632, 625
See application file for complete search history.

(56) References Cited

U.S. PATENT DOCUMENTS

| | | | |
|---|---|---|---|
| 2011/0181619 A1* | 7/2011 | Kwon | H04M 1/72555 345/629 |
| 2014/0298153 A1* | 10/2014 | Tsujimoto | G02B 21/365 715/232 |
| 2015/0091940 A1* | 4/2015 | Emori | G09G 5/377 345/629 |
| 2015/0229681 A1 | 8/2015 | Tsubone et al. | |
| 2015/0334350 A1 | 11/2015 | Tamura et al. | |
| 2016/0036871 A1 | 2/2016 | Tsubone et al. | |
| 2016/0234149 A1* | 8/2016 | Tsuda | H04L 67/306 |

\* cited by examiner

FIG. 14A

TABLE 2 st001

| STROKE DATA ID | START TIME | END TIME | COLOR | WIDTH | COORDINATE ARRANGEMENT DATA ID |
|---|---|---|---|---|---|
| s001 | 20150522152202 | 20150522152205 | ff0000 | 2 | c001 |
| s002 | 20150522152612 | 20150522152615 | 000ff0 | 3 | c002 |
| s003 | 20150522152704 | 20150522152712 | ff0000 | 1 | c003 |
| ... | ... | ... | ... | ... | ... | st002

| COORDINATE ARRANGEMENT DATA ID |
|---|
| ... |
| ... |
| ... |
| ... | st003

| COORDINATE ARRANGEMENT DATA ID |
|---|
| ... |
| ... |
| ... |
| ... |

FIG. 14B

TABLE 3

| X COORDINATE | Y COORDINATE | DIFFERENCE TIME | c001 PRESSURE | c002 PRESSURE | c003 PRESSURE |
|---|---|---|---|---|---|
| 10 | 10 | 100 | 255 | | |
| 12 | 10 | 200 | 255 | | |
| 14 | 12 | 300 | 255 | | |
| ⋮ | ⋮ | ⋮ | ⋮ | ⋮ | ⋮ |

COMMUNICATION TERMINAL, COMMUNICATION SYSTEM, COMMUNICATION CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2015-234557, filed on Dec. 1, 2015, in the Japan Patent Office, the entire disclosure of which is hereby incorporated by reference herein.

BACKGROUND

Technical Field

The present invention relates to a communication terminal, a communication system, a communication control method, and a non-transitory recording medium.

Description of the Related Art

With the need for reducing costs or times associated with business trips, communication systems are widely used, which are capable of carrying out videoconferences among remotely located sites through a communication network such as the Internet. The communication systems enable transmission or reception of content data among a plurality of communication terminals. The content data may be display data such as an image of a videoconference participant or an image of presentation material, and stroke data reflecting drawings made by the participant.

For example, as described in Japanese Patent Application Publication No. 2015-70345-A1, the communication system may be provided with a server that allows the plurality of communication terminals to share stroke data, such as a drawing drawn by the participant in the videoconference. However, some communication terminals are not capable of managing stroke data, which may frequently change according to the drawing image drawn by the participant.

SUMMARY

Example embodiments of the present invention include a communication terminal, which displays an image being shared with a first communication terminal and a second communication terminal, the image having a plurality of image layers superimposed one above the other. In response to a user input for changing appearance of a first image layer of the image, the communication terminal stores information reflecting the change caused by the user input to the first image layer in a memory, and generates an updated image having the first image layer that reflects the change caused by the user input, based on the information reflecting the change caused by the user input to the first image layer. The communication terminal transmits the information reflecting the change to the first image layer to the first communication terminal to cause the first communication terminal to generate and display the updated image. The communication terminal transmits the updated image having the first image layer that reflects the change to the second communication terminal to cause the second communication terminal to store the updated image.

Example embodiments of the present invention include a communication system including the above-described communication terminal, the first communication terminal, and the second communication terminal. The second communication terminal may be a communication management server that controls communication among a plurality of communication terminals.

Example embodiments of the present invention include a method of controlling sharing of an image, and a recording medium storing a program for controlling sharing of an image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 14A and FIG. 14B are examples of table managed by the electronic whiteboard of the communication system of FIG. 1.

Figure 1:
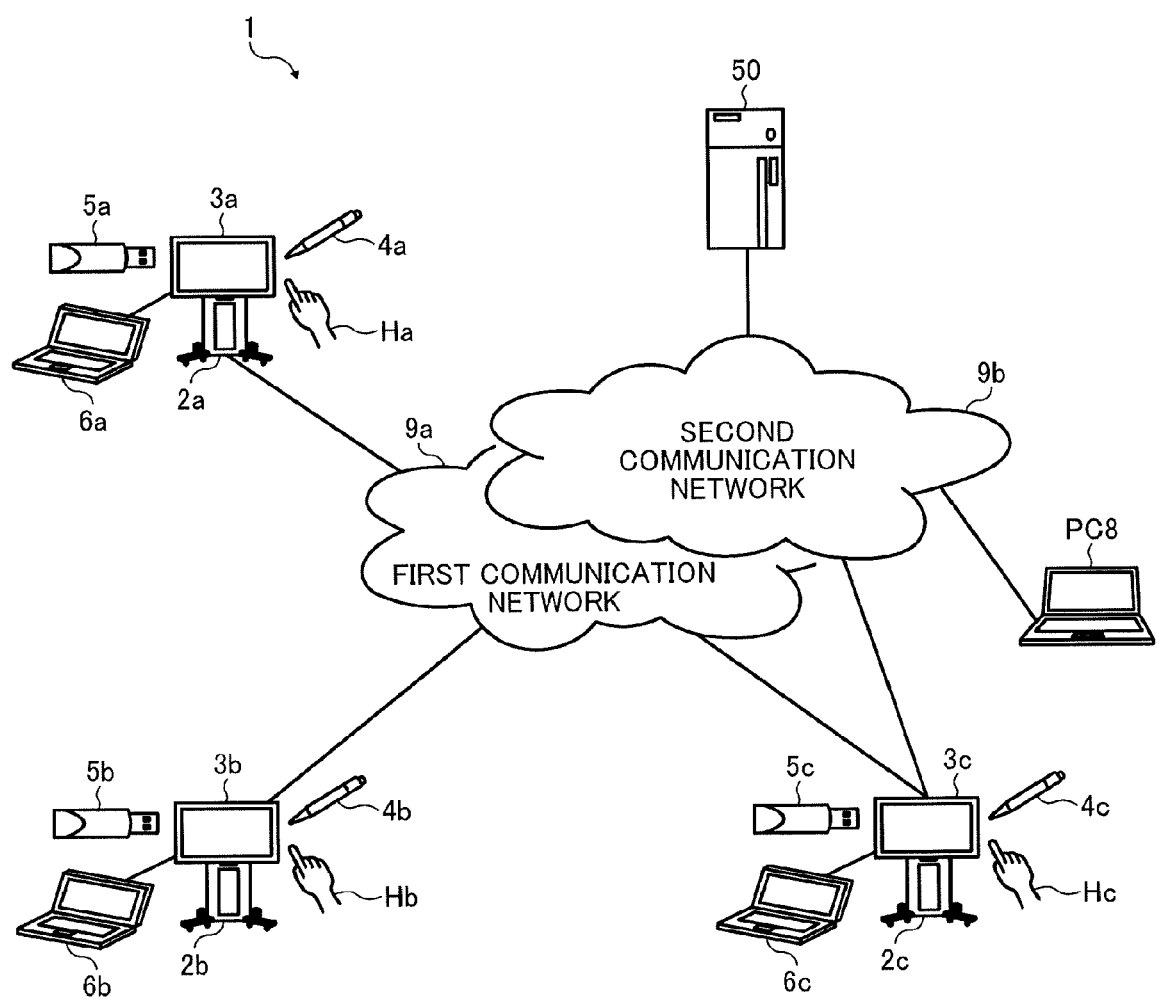
FIG. 1 is a schematic diagram illustrating a communication system according to an example embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described.

<Configuration of Communication System>

Referring to FIG. 1, a configuration of a communication system 1 is described according to an embodiment. FIG. 1 is a schematic diagram illustrating the communication system 1 according to the embodiment.

The communication system 1 includes a plurality of electronic white boards 2a, 2b, and 2c, a personal computer (PC) 8, a relay device 30, and a communication management system 50.

The electronic whiteboards 2a, 2b, and 2c are connected via a first communication network 9a to be communicable with one another. The electronic whiteboards 2a, 2b, and 2c are respectively provided with displays 3a, 3b, and 3c.

The electronic whiteboards 2a, 2b, and 2c respectively cause the displays 3a, 3b, and 3c to display drawing images, drawn with electronic pens 4a, 4b, and 4c or the user's hands Ha, Hb, and He. For simplicity, any arbitrary one of the electronic whiteboards 2a, 2b, and 2c is referred to as the electronic whiteboard 2. Similarly, any arbitrary one of the displays 3a, 3b, and 3c is referred to as the display 3. Any arbitrary one of the electronic pens 4a, 4b, and 4c is referred to as the electronic pen 4. Any arbitrary one of the user's hands Ha, Hb, and He is referred to as the hand H. Further, the electronic whiteboard 2 may change the drawing image being displayed on the display 3, according to an event made by the user's hand H. For example, in response to the user's gesture indicating size enlargement, size reduction, or turning pages, the electronic whiteboard 2 changes the image size or switches a screen. For simplicity, any arbitrary one of the electronic whiteboards 2a, 2b, and 2c is referred to as the electronic whiteboard 2. Similarly, any arbitrary one of the displays 3a, 3b, and 3c is referred to as the display 3. Any arbitrary one of the electronic pens 4a, 4b, and 4c is referred to as the electronic pen 4. Any arbitrary one of the users Ha, Hb, and He is referred to as the hand H.

The electronic whiteboards 2a, 2b, and 2c are respectively connectable to the universal serial bus (USB) memories 5a, 5b, and 5c. The electronic whiteboards 2a, 2b, and 2c may read or write electronic files, which may be written in portable document format (PDF), onto or from the USB memories 5a, 5b, and 5c. The electronic whiteboards 2a, 2b, and 2c are respectively connected to note PCs 6a, 6b, and 6c, via cables, to be communicable in compliance with the standard such as DisplayPort, Digital Visual Interface (DVI), High-Definition Multimedia Interface (HDMI; Registered Trademark), or Video Graphics Array(VGA). Any one of the USB memories 5a, 5b, and 5c is referred to as the USB memory 5. Any one of the note PCs 6a, 6b, and 6c is referred to as the note PC 6.

The stroke data, which is the drawing drawn on the display 3 of the electronic whiteboard 2, captured at a first site is transmitted to a second site through the first communication network 9a for output through the display 3 of the electronic whiteboard 2 at the second site. Similarly, the stroke data, which is the drawing drawn on the display 3 of the electronic whiteboard 2 at the second site, is transmitted to the first site through the first communication network 9a for output through the display 3 of the electronic whiteboard 2 at the first site. As described above, the drawing images can be shared among remotely located sites, such that the communication system 1 with the electronic whiteboards 2 can facilitate communication in a videoconference.

In addition to the electronic whiteboard 2, the drawings, such as stroke data, can be shared by any desired communication terminal connected to the first communication network 9a. Examples of such communication terminal include, PC, videoconference terminal, tablet, smart phone, digital signage, telestrator, image processing apparatus, portable information processing device, digital video camera, digital still camera, and game machine. The telestrator may be used for providing information on sports or weather. The image processing apparatus may be used to provide a remote medical diagnosis system. The game machine may be one example of any terminal capable of providing a frame of image data.

The electronic whiteboard 2c, the PC 8, and the management system 50 are connected via a second communication network 9b to be communicable with one another.

The electronic whiteboard 2c and the PC 8 communicate with each other to transmit or receive display data, such as image data for videoconferencing, as an example of content data. The display data is any image data that can be displayed on a display, such as an image captured at one site during videoconference. More specifically, the display data may be a video image or a still image, or both of the video image and the still image.

The management system 50 centrally manages communicates states of the electronic whiteboard 2c and the PC 8.

While the electronic whiteboard 2c and the PC 8 are connected to the second communication network 9b in this example, any other communication terminal may be connected to the second communication network 9b to share display data with the electronic whiteboard 2c and the PC 8. Examples of such communication terminal include, but not limited to, videoconference terminal, tablet, smart phone, digital signage, telestrator, image processing apparatus, portable information processing terminal, digital video camera, digital still camera, and game machine.

In this embodiment, the electronic whiteboard 2c activates a module for sharing stroke data, and a module for sharing display data, to share stroke data and display data among the communication terminals.

In one example, the first communication network 9a is the Intranet, and the second communication network 9b is the Internet. The communication networks 9a and 9b may be previously determined according to communications protocol of the communication terminals in the communication system 1, and may be selected from the Internet, local area network (LAN), the Intranet, and mobile phone network. The communication networks 9a and 9b may be the same communication network, such as the Internet.

The example illustrated in FIG. 1 uses the USB memory 5 as a memory attachable to the electronic whiteboard 2, however, any desired memory may be used such as a SD card.

<Hardware Configuration of Electronic Whiteboard>

Figure 2:
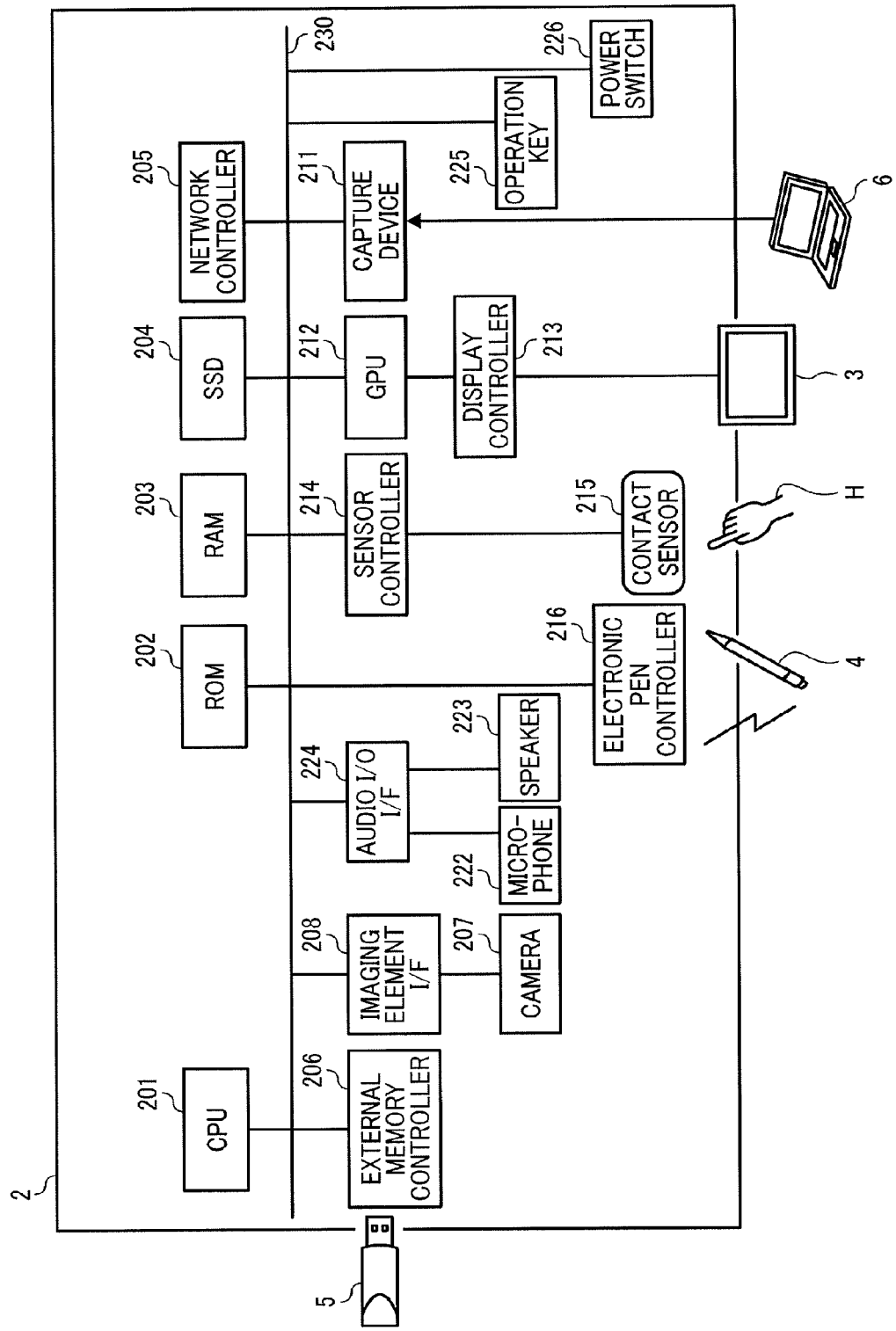
FIG. 2 is a schematic block diagram illustrating a hardware configuration of an electronic whiteboard of the communication system of FIG. 1.

FIG. 2 illustrates a hardware configuration of the electronic whiteboard 2, according to the embodiment. FIG. 2 is a schematic block diagram illustrating a hardware configuration of the electronic whiteboard 2 illustrated in FIG. 1.

As illustrated in FIG. 2, the electronic whiteboard 2 includes a central processing unit (CPU) 201 that controls entire operation of the electronic whiteboard 2, a read only memory (ROM) 202 that stores a program for operating the CPU 201 such as an initial program loader (IPL), a random access memory (RAM) 203 that operates as a work area for the CPU 201, a solid state drive (SSD) 204 that controls reading or writing of various types of data including control program stored in a memory, a network controller 205 that controls communication via the communication network 9a or 9b, and an external memory controller 206 that controls communication with the USB memory 5. The electronic whiteboard 2 further includes a camera 207 that captures an object under control of the CPU 201, an imaging element OF 208 that controls operation of the camera 207, a capture device 211 that transmits image data (still or moving image) for display at the note PC 6, a graphics processing unit (GPU) 212 that processing graphics, and a display controller 213 that controls transmission of image data output from the GPU 212 to the display 3. The electronic whiteboard 2 further includes a sensor controller 214 and a contact sensor 215. The sensor controller 214 controls operation of the contact sensor 215. The contact sensor 715 detects a touch onto the display 3 with the electronic pen 4 or the user's hand H. In this example, the contact sensor 215 senses a touch input to a specific coordinate on the display 3 using the infrared blocking system. More specifically, the display 3 is provided with two light receiving elements disposed on both upper side ends of the display 3, and a reflector frame. The light receiving elements emit a plurality of infrared rays in parallel to a touch panel of the display 3. The light receiving elements receive lights passing in the direction that is the same as an optical path of the emitted infrared rays, which are reflected by the reflector frame. The contact sensor 215 outputs an identifier (ID) of the infrared ray that is blocked by an object (such as the user's hand) after being emitted from the light receiving elements, to the sensor controller 214. Based on the ID of the infrared ray, the sensor controller 214 detects a specific coordinate that is touched.

The contact sensor 215 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. Alternatively, the contact sensor 215 may identify the contact position using the camera 207.

The electronic whiteboard 2 further includes an electronic pen controller 216. The electronic pen controller 216 communicates with the electronic pen 4 to detect a touch by the tip or bottom of the pen 4 to the display 3. In addition or in alternative to detecting a touch by the tip or bottom of the pen 4, the electronic pen controller 216 may also detect a touch by another part of the electronic pen 4, such as a part held by a hand.

The electronic whiteboard 2 further includes a microphone 222 that inputs audio, a speaker 223 that outputs audio, an audio input/output OF 224 that processes input or output of audio signals between the microphone 222 and the speaker 223 under control of the CPU 201, operation key(s) 225 that receives user inputs, and a power switch 226 that turns on or off the electronic power of the electronic whiteboard 2.

The electronic whiteboard 2 further includes a bus line 230, such as an address bus or a data bus, which electrically connects the elements illustrated in FIG. 2.

The control program for the electronic whiteboard 2 may be stored on a computer-readable recording medium such as a CD-ROM for distribution, or stored on a server on any desired network to be downloaded.

<Hardware Configuration of Communication Management System>

Figure 3:
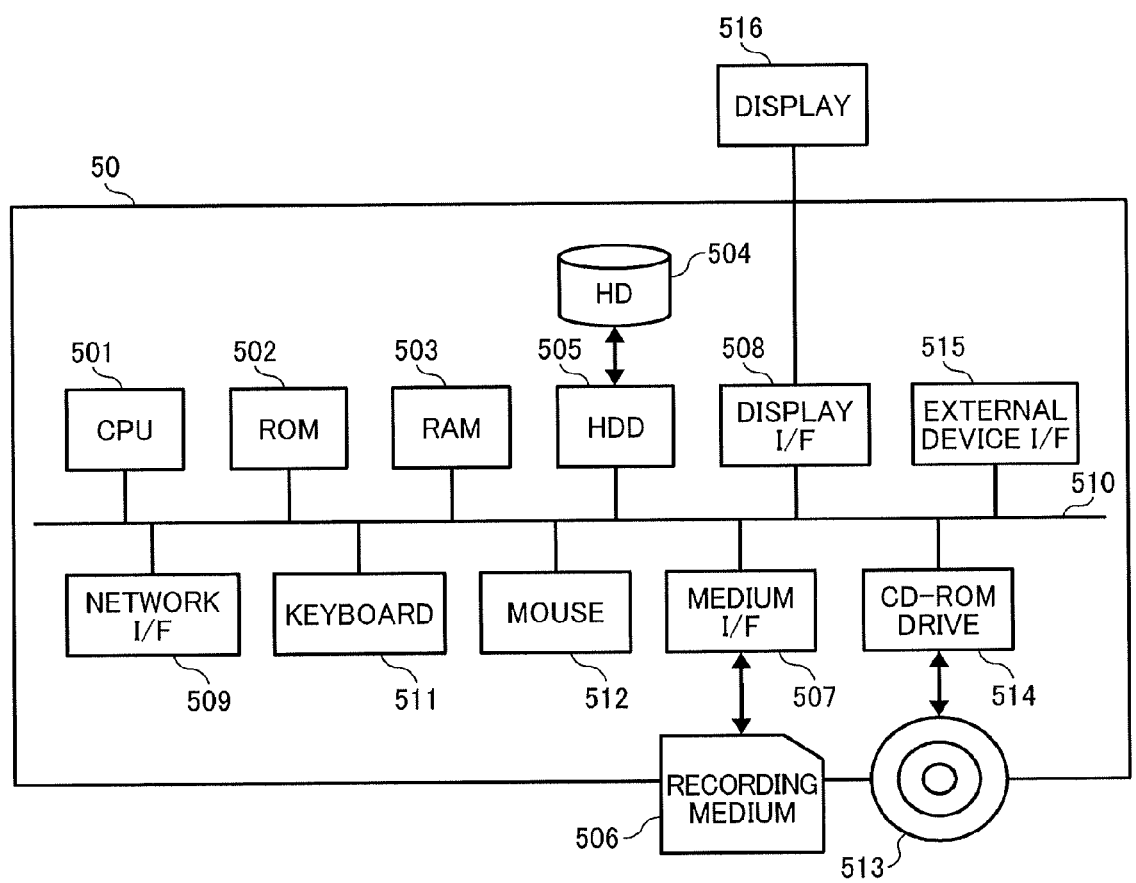
FIG. 3 is a schematic block diagram illustrating a hardware configuration of a communication management system of the communication system of FIG. 1.

Referring to FIG. 3, a hardware configuration of the communication management system 50 is described according to an embodiment of the present invention. FIG. 3 is a schematic block diagram illustrating a hardware configuration of the communication management system 50 according to the embodiment.

The management system 50 includes a CPU 501 that controls entire operation of the management system 50, a ROM 502 that stores a communication control program, a RAM 503 that operates as a work area for the CPU 501, a hard disk (HD) 504 that stores various data, a HDD 505 that controls reading or writing of various data from or to the HD 504 under control of the CPU 501, and a medium I/F 507 that controls reading or writing of data with respect to a recording medium 506 such as a flash memory. The management system 50 further includes a display I/F 508 that displays various information on a display 516 such as a curser, menu, window, character, or image, a network I/F 509 that controls transmission of data through the communication network 9a or 9b, a keyboard 511 provided with a plurality of keys for inputting a character, numeral, or instruction, and a mouse 512 that selects or executes an instruction through selection of a processing target or movement of a mouse curser. The management system 50 further includes a CD-ROM drive 514 that controls reading or writing with respect to a CD-ROM 513 as an example of removable memory, an external device I/F 515 that controls transmission of various data with an external device, and a bus line 510, such as an address bus or a data bus, that electrically connects the elements illustrated in FIG. 3.

Note that the communication control program may be recorded in a file in a format installable or executable on a computer-readable recording medium such as the recording medium 506 or the CD-ROM 513 for distribution. The communication control program may be stored on the HD 504.

<Hardware Configuration of PC>

Figure 4:
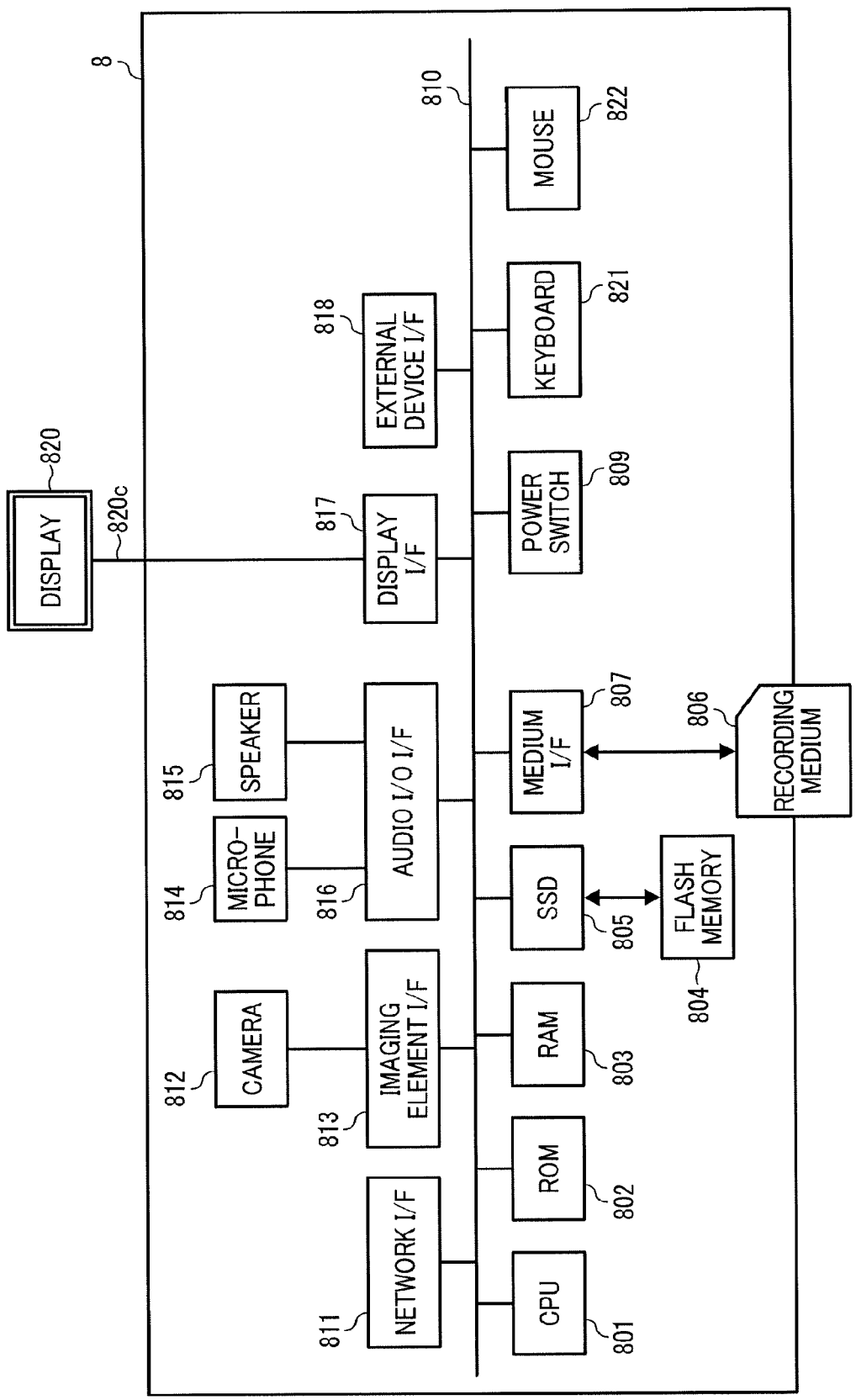
FIG. 4 is a schematic block diagram illustrating a hardware configuration of a personal computer (PC) operating as a videoconference terminal, according to an embodiment of the present invention.

FIG. 4 illustrates a hardware configuration of the PC 8, as an example of videoconference terminal, according to the embodiment. The PC 8 includes a central processing unit (CPU) 801, a read only memory (ROM) 802, a random access memory (RAM) 803, a flash memory 804, a solid state drive (SSD) 805, a medium interface (I/F) 807, a power switch 809, a bus line 810, a network I/F 811, a camera 812, an imaging element I/F 813, a microphone 814, a speaker 815, an audio input/output I/F 816, a display I/F 817, an external device I/F 818, a keyboard 821, and a mouse 822. The CPU 801 controls entire operation of the PC 8. The ROM 802 stores a control program for operating the CPU 801 such as an Initial Program Loader (IPL). The RAM 803 is used as a work area for the CPU 801. The flash memory 804 stores various data such as a communication control program, display data, and audio data. The SSD 805 controls reading or writing of various data with respect to the flash memory 804 under control of the CPU 801. In alternative to the SSD, a hard disk drive (HDD) may be used. The medium I/F 807 controls reading or writing of data with respect to a recording medium 806 such as a flash memory.

The network I/F 811 controls communication of data with an external device through the second communication network 9b. The camera 812 is an example of imaging device capable of capturing an object under control of the CPU 801, and is incorporated in the PC 8. The imaging element I/F 813 is a circuit that controls driving of the camera 812. The microphone 814 is an example of audio collecting device capable of inputting audio under control of the CPU 801, and is incorporated in the PC 8. The audio I/O I/F 816 is a circuit for inputting or outputting an audio signal between the microphone 814 and the speaker 815 under control of the CPU 801. The display I/F 817 is a circuit for transmitting display data to the external display 820 under control of the CPU 801. The external device I/F 818 is an interface circuit that connects the PC 8 to various external devices. The keyboard 821 is one example of input device provided with a plurality of keys for allowing a user to input characters, numerals, or various instructions. The mouse 812 is one example of input device for allowing the user to select a specific instruction or execution, select a target for processing, or move a curser being displayed.

The bus line 810 is an address bus or a data bus, which electrically connects the elements in FIG. 4 such as the CPU 801.

The display 820 may be a liquid crystal or organic electroluminescence (EL) display that displays an image of a subject, an operation icon, or the like. The display 820 is connected to the display I/F 817 by a cable 820c. The cable 820c may be an analog red green blue (RGB) (video graphic array (VGA)) signal cable, a component video cable, a high-definition multimedia interface (HDMI) signal cable, or a digital video interactive (DVI) signal cable.

The camera 812 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device I/F 818 is capable of connecting an external device such as an external camera, an external microphone, or an external speaker through a Universal Serial Bus (USB) cable or the like. In the case where an external camera is connected, the external camera is driven in preference to the built-in camera 812 under control of the CPU 801. Similarly, in the case where an external microphone is connected or an external speaker is connected, the external microphone or the external speaker is driven in preference to the built-in microphone 814 or the built-in speaker 815 under control of the CPU 801.

The recording medium 806 is removable from the PC 8. The recording medium 801 can be any non-volatile memory that reads or writes data under control of the CPU 801, such that any memory such as an electrically erasable and programmable read-only memory (EEPROM) may be used instead of the flash memory 804.

<Software Configuration>

Figure 5A:
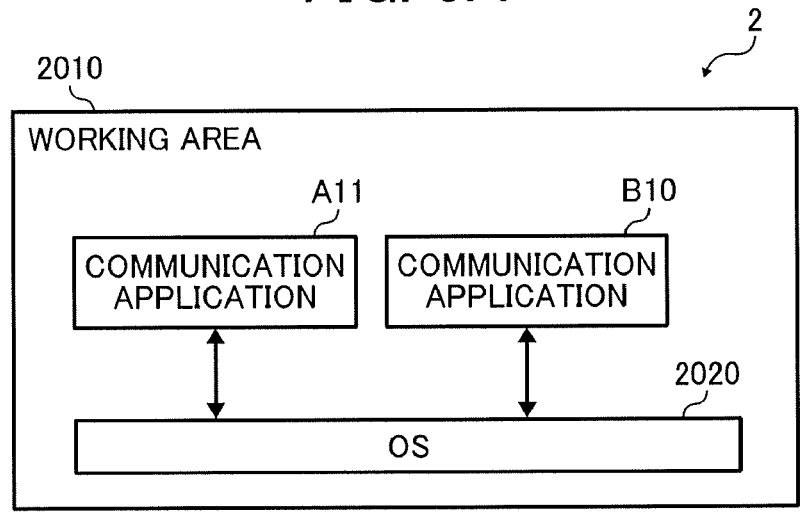
FIG. 5A is a schematic block diagram illustrating a software configuration of the electronic whiteboard of FIG. 2, according to an embodiment of the present invention.

FIG. 5A is a schematic block diagram illustrating a software configuration of the electronic whiteboard 2 of FIG. 2, according to an embodiment of the present invention. As illustrated in FIG. 5A, the electronic whiteboard 2 is installed with an operating system (OS) 2020, first communication application A11, and second communication application B10, each of which operates on a work area 2010 of the RAM 203.

The OS 2020 is basic software that controls entire operation of the electronic whiteboard 2 through providing basic functions. The communication application A11 and B10 each enable the electronic whiteboard 2 to communicate with the other electronic whiteboard (or communication terminal), using different communication protocols. The first communication application A11 provides the electronic whiteboard 2 with a communication control function of controlling transmission of stroke data with the other communication terminal, and an image processing function of outputting stroke data as an image. The second communication application B10 provides the electronic whiteboard 2 with a communication control function of controlling transmission of display data (such as image data for videoconferencing) with the other communication terminal, and an image processing function of outputting display data as an image.

The OS 2020 and the first communication application A11 are installed onto the electronic whiteboard 2 before shipment. The second communication application B10 may be installed onto the electronic whiteboard 2, after shipment. In the following, it is assumed that the electronic whiteboard 2c is installed with the second communication application B10, and the electronic whiteboards 2a and 2b are not installed with the second communication application B10.

Figure 5B:
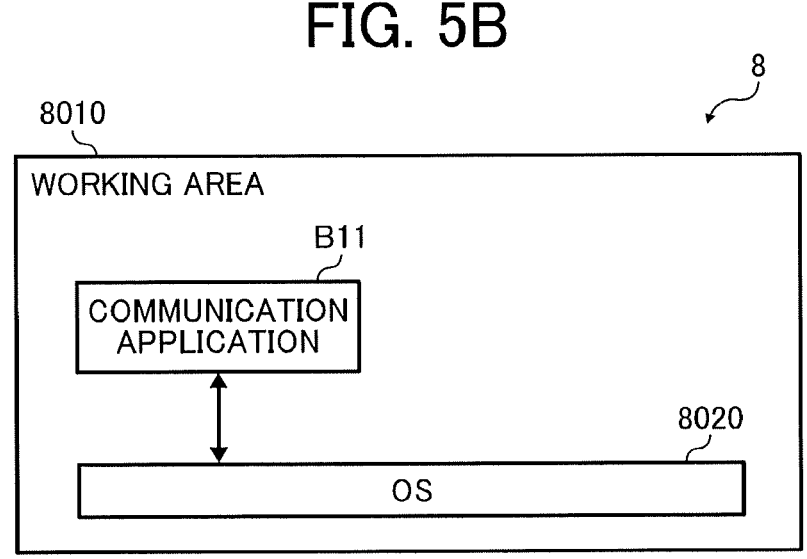
FIG. 5B is a schematic block diagram illustrating a software configuration of the PC of FIG. 4, according to an embodiment of the present invention.

FIG. 5B is a schematic block diagram illustrating a software configuration of the PC 8 of FIG. 4, according to an embodiment of the present invention. As illustrated in FIG. 5B, the PC 8 is installed with operating system (OS) 8020, and the third communication application B11, which may be deployed on a working area 8010 of the RAM 803.

The OS 8020 is basic software that controls entire operation of the PC 8 through providing basic functions. The third communication application B11 provides the PC 8 with the communication control function of controlling transmission of display data with the other communication terminal, and the image processing function of outputting display data as an image.

The OS 8020 and the third communication application B11 are installed onto the PC 8 before or after shipment.

<Functional Configuration of Communication System>

Figure 6:
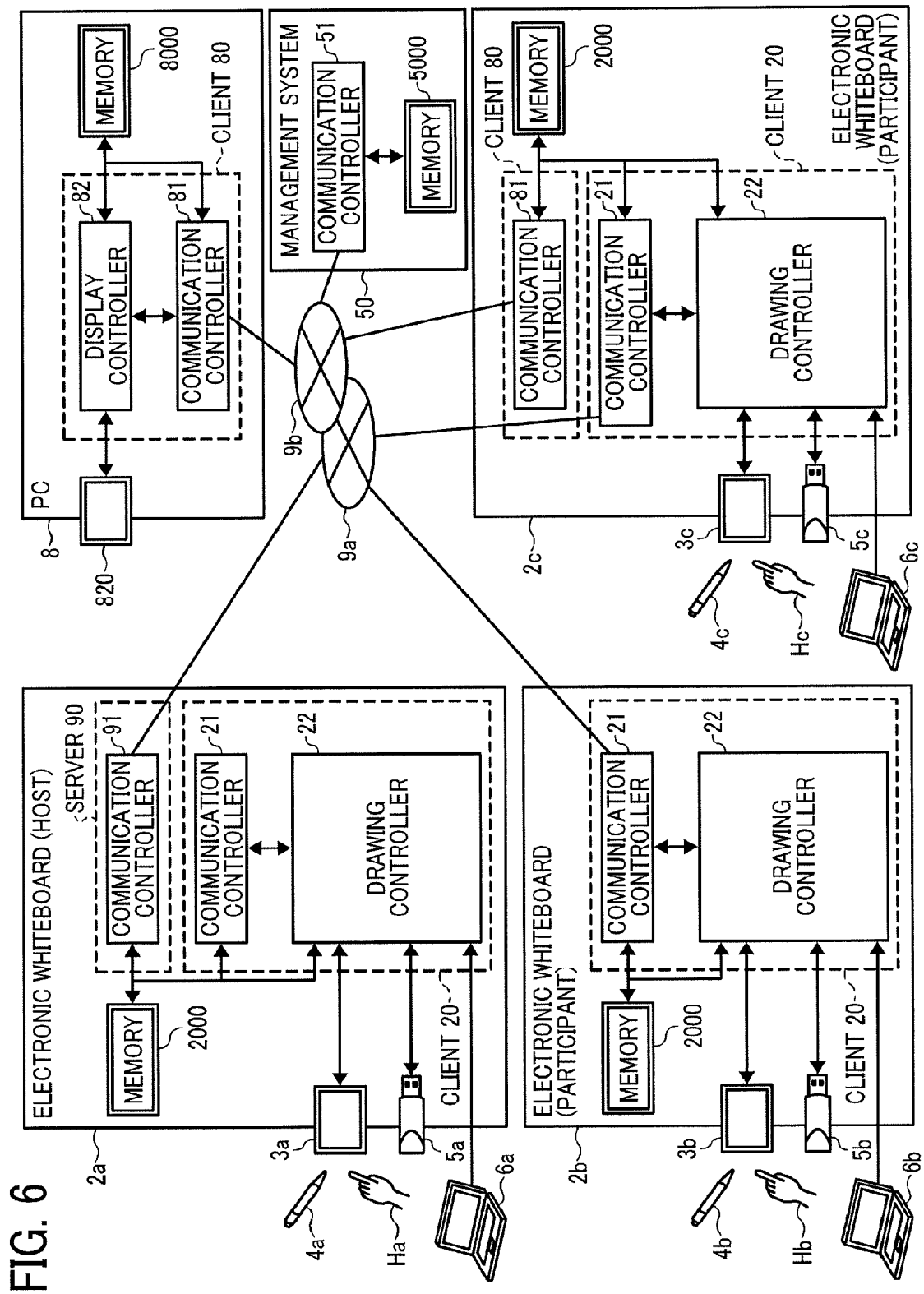
FIG. 6 is a schematic block diagram illustrating a functional configuration of the electronic whiteboard, the PC, and the communication management system of the communication system of FIG. 1.

Now, a functional configuration of the communication system 1 is described according to an embodiment of the present invention. FIG. 6 is a schematic block diagram illustrating a functional configuration of the electronic whiteboard 2, the PC 8, and the management system 50 of the communication system of FIG. 1. In FIG. 6, the electronic whiteboards 2a, 2b, and 2c are connected through the first communication network 9a to transmit or receive data. Further, in FIG. 6, the electronic whiteboard 2c, the PC 8, and the management system 50 are connected through the second communication network 9b to transmit or receive data.

The electronic whiteboard 2 includes hardware of FIG. 2, which operates in cooperation with the control program, to implement the functional configuration of FIG. 6. The electronic whiteboard 2 includes a memory 2000 implemented by the SSD 204. The PC 8 includes the hardware of FIG. 4, which operates in cooperation with the control program, to implement the functional configuration of FIG. 6. The PC 8 includes a memory 8000 implemented by the SSD 805.

The electronic whiteboard 2 may function as a "host terminal" that requests to start communication to share images, or a "participant terminal" that participates in communication started by the host terminal. The electronic whiteboard 2 mainly includes a client section ("client") 20 and a server section ("server") 90. The client 20 and the server 90 are functions performed by one electronic whiteboard 2, with activation of the first communication application A11. Alternatively, the electronic whiteboard two may only function as the client 20, while causing other apparatus such as a distribution control apparatus to operate as the server 90.

In case the electronic whiteboard 2 operates as the host terminal, such electronic whiteboard 2 implements both of the client 20 and the server 90. In case the electronic whiteboard 2 operates as the participant terminal, such electronic whiteboard 2 implements the client 20 but not the server 90. For example, in case the electronic whiteboard 2a operates as the host terminal, and the electronic whiteboards 2b and 2c each operate as the participant terminal, the client 20 of the electronic whiteboard 2a communicates with the client 20 of each of the electronic whiteboards 2b and 2c, through the server 90 in the electronic whiteboard 2a. The client 20 of each one of the electronic whiteboards 2b and 2c communicates with the client 20 of the electronic whiteboard 2a, 2b, or 2c, through the server 90 in the electronic whiteboard 2a.

The electronic whiteboard 2b and the PC 8 implement the client 80, with activation of the second communication application B10 and the third communication application B11, respectively. The client 80 communicates with the client 80 of the other communication terminal through a communication session established based on a call control by the management system 50 operating as a server.

The client 20 includes a communication controller 21 and a drawing controller 22. The communication controller 21, which may be implemented by the instructions of the CPU 201, or the network controller 205, controls communication with the other electronic whiteboard 2 or a communication controller 91 of the server 90, through the first communication network 9a.

The drawing controller 22, which may be implemented by the instructions of the CPU 201, performs image processing on stroke data that is generated in response to operation on the display 3, or various data obtained from any desired device. Examples of such device include, but not limited to, the USB memory 5, the note PC 6, the communication controller 21, and the memory 2000. The drawing controller 22 generates an image layer based on the processed image data, and controls output of a combined image on which a plurality of image layers are superimposed one above the other.

Figure 7:
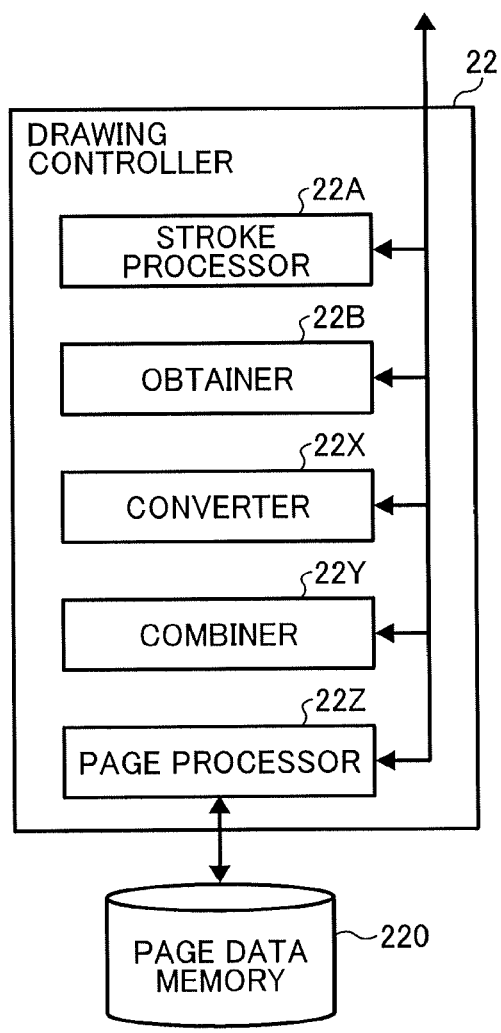
FIG. 7 is a schematic block diagram illustrating a drawing controller of the electronic whiteboard of FIG. 5A, according to an embodiment of the present invention.

FIG. 7 illustrates a functional configuration of the drawing controller 22 according to an embodiment. The drawing controller 22 includes a stroke processor 22A, an obtainer 22B, a converter 22X, a combiner 22Y, and a page processor 22Z.

The stroke processor 22A, which may be implemented by the instructions of the CPU 201, generates stroke data that reflects the user's drawing on the display 3 with the electronic pen 4 or the user's hand H. More specifically, the stroke data may be a stroke of a character, mark, or any other drawing, which may be drawn by the user. As described below referring to tables 1 to 4, in this disclosure, the stroke corresponds to a drawing made by a user with a single unbroken movement, for example, with the electronic pen.

The obtainer 22B, which may be implemented by the instructions of the CPU 201, obtains data stored in the memory 2000.

The converter 22X, which may be implemented by the instructions of the CPU 201, converts various data. For example, the converter 22X performs textization, real (binary) data conversion, serialization, deserialization, encoding, and decoding.

The combiner 22Y, which may be implemented by the instructions of the CPU 201, generates an image layer based on each type of data, and cause those image layers to be superimposed one above the other. Examples of image data types include a user interface (UI) data, stroke data, medium data (display data), background image data, and object data. The UI data is used for generating a user interface, which includes, for example, a message for display to the user and an icon for selection by the user. The background image data is used for generating a background image, such as a frame to be used for defining a layout of the image. The stroked data, the medium data, and the object data are described below in detail.

The page processor 22Z, which may be implemented by the instructions of the CPU 201, associates the stroke data and the display data for the same one page, and stores this set of stroke data and display data in a page data memory 220 of the memory 2000.

The page data memory 220 is a memory area of the memory 2000, which stores page data as illustrated in Table 1. Table 1 illustrates an example data structure of page data. The page data includes one-page data to be displayed on the display 2, which includes stroke arrangement data (items of stroke data for one character, etc.), and medium data as an example of display data.

TABLE 1

| PAGE DATA ID | START TIME | END TIME | STROKE ARRANGE-MENT DATA ID | MEDI-UM DATA ID |
|---|---|---|---|---|
| S001 | 20150522152034 | 20150522152402 | st001 | m001 |
| S002 | 20150522152415 | 2015522152825 | st002 | m002 |
| S003 | 20150522153345 | 20150522154033 | st003 | m003 |
| ... | ... | ... | ... | ... |

The page data includes a page data ID for identifying a specific page, start time when display of that page is started, end time when drawing to that page by a stroke drawing or a gesture is stopped, a stroke arrangement data ID for identifying stroke arrangement data, and a medium data ID for identifying medium data. The stroke arrangement data is to be used for displaying a set of stroke drawings on the display 3, as the stroke drawings are made by the user with the electronic pen 4 or the user's hand H. The medium data is to be used for displaying the other image (referred to as the display data) on the display 3, together with the stroke drawing.

The stroke arrangement data includes various information as illustrated in Table 2 (FIG. 14A). Table 2 illustrates an example data structure of stroke arrangement data. As illustrated in Table 2, one stroke arrangement data, identified with the stroke arrangement data ID in Table 1, includes a plurality of items of stroke data, each corresponding to one stroke drawing. Each stroke data includes a stroke data ID for identifying that stroke data, start time when drawing of that stroke starts, end time when drawing of that stroke ends, a color of the stroke, a width of the stroke, and a coordinate arrangement data ID for identifying arrangement of points of the stroke. For example, in case the user draws the alphabet "S" with the electronic pen 4 in one stroke, one stroke data ID is assigned to that stroke drawing "S". In case the user draws the alphabet "T" with the electronic pen 4 in two strokes, two stroke data IDs are assigned to those two stroke drawings "T".

The coordinate arrangement data includes various information as illustrated in Table 3 (FIG. 14B). Table 3 illustrates an example data structure of the coordinate arrangement data. The coordinate arrangement data includes a single point (X coordinate value, Y coordinate value) on the display 3, difference time (ms) indicating a difference between the time when that point is drawn and the start time when drawing of the stroke starts, and pressure by the electronic pen 4 on that single point. That is, one item of coordinate arrangement data in Table 2 is a collection of single points in Table 3. For example, in case the user draws the alphabet "S" with the electronic pen 4 in one stroke, a plurality of points will be drawn, such that the coordinate arrangement data assigned with a specific data ID (such as, c001) corresponds to those points in the stroke drawing that are managed with Table 3.

The medium data of the page data in Table 1 includes various information as illustrated in Table 4. Table 4 illustrates an example data structure of medium data. As illustrated in Table 4, the medium data includes a medium data ID for identifying the medium data as managed with Table 1, a type of the medium data, recording time when the medium data is recorded, a position of an image to be displayed on the display 3 based on the medium data (X coordinate, Y coordinate), a size of the image (width, height), and data indicating content of the medium data. The position of the image to be displayed based on the medium data is defined by the upper left corner of that image, when the X and Y coordinates of the upper left corner of the display 3 are set to (0, 0).

with activation of the communication application B11. The display controller 82 performs image processing based on data obtained from the communication controller 21 or the memory 8000, and controls output of processed image data.

The management system 50 includes the hardware of FIG. 3, which operates in cooperation with the control program, to implement the functional configuration of FIG. 6. The management system 50 further includes a memory 5000, which may be implemented by the HD 504.

The communication controller 51 of the management system 50, which may be implemented by the instructions of the CPU 501, controls communication with the communication controller 81 of the client 80 in the electronic whiteboard 2 or the PC 8.

<Operation>

Referring now to FIGS. 8 to 11, operation of controlling display of various data is described according to an embodiment.

Figure 8:
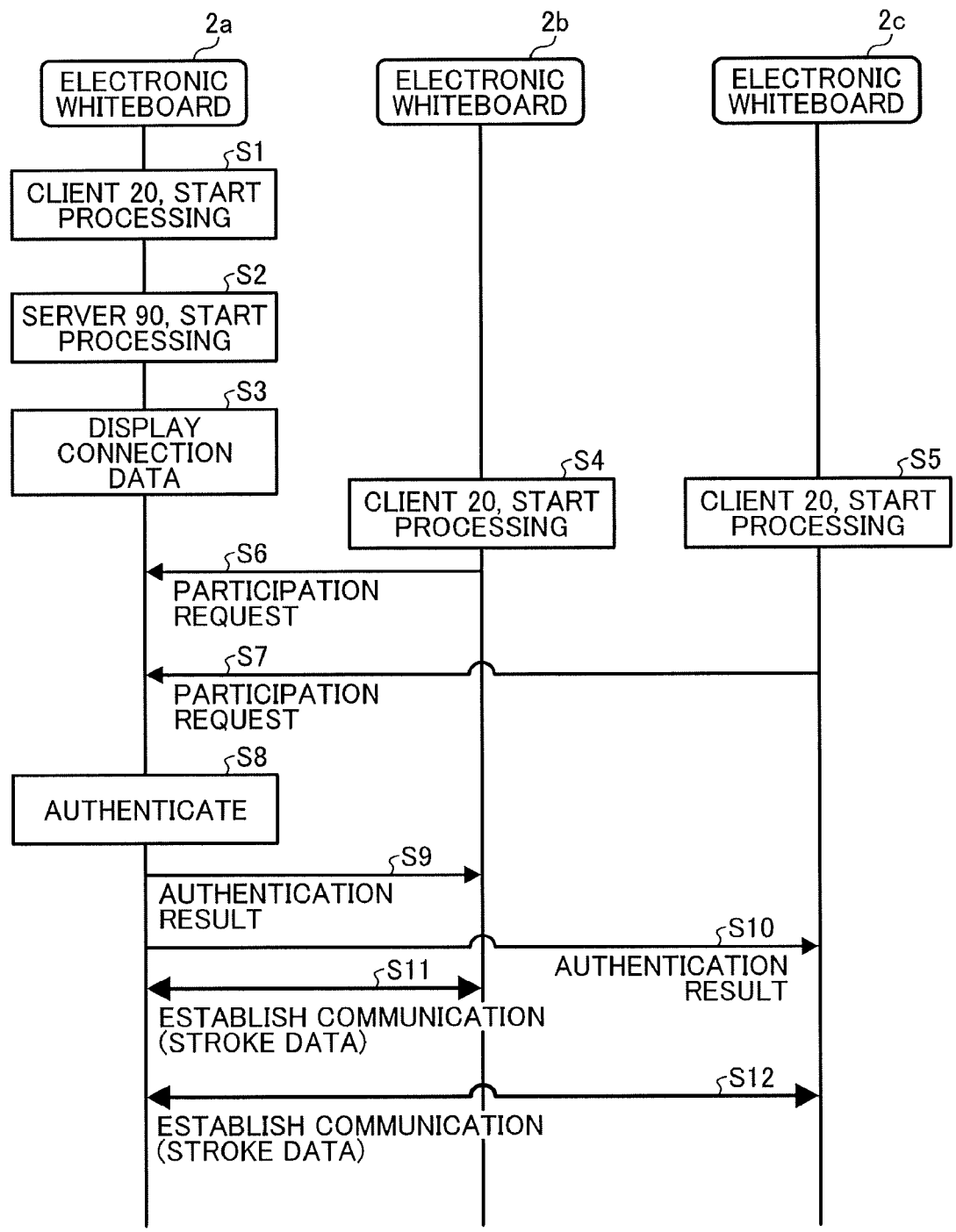
FIG. 8 is a data sequence diagram illustrating operation of establishing communication among the electronic whiteboards of FIG. 1, according to an embodiment of the present invention.

Referring to FIG. 8, operation of establishing communication among the electronic whiteboards 2a, 2b, and 2c, with the communication application A11, is described according to the embodiment. As the power switch 226 of the electronic whiteboard 2a is turned on by the user, the first communication application A11 is activated to start processing by the client 20 of the electronic whiteboard 2a (S1). In response to receiving a request for starting a conference through operation onto the display 3a, the communication controller 21 of the client 20 transmits an instruction to start processing by the server 90, to the communication controller 91 of the server 90 in the same electronic whiteboard 2a. Accordingly, the electronic whiteboard 2a is able to start various processing by the server 90, in addition to processing by the client 20 (S2).

The communication controller 91 of the electronic whiteboard 2a generates connection data to be used for establishing connection with the electronic whiteboard 2a. The client 20 causes the display 3a to display the generated connection data (S3). The connection data includes the IP address of the host terminal, and a pass code that is generated for the communication session to be established for image sharing.

TABLE 4

| MEDIUM DATA ID | DATA TYPE | RECORDING TIME | X | Y | WIDTH | HEIGHT | DATA |
|---|---|---|---|---|---|---|---|
| m001 | IMAGE | 20150522152632 | 1400 | 50 | 400 | 300 | abc.jpg |
| ... | ... | ... | ... | ... | ... | ... | ... |

Now, a functional configuration of the server 90 is described. The server 90 includes a communication controller 91.

The communication controller 91, which may be implemented by the instructions of the CPU 201, controls communication with the communication controller 21 of the client 20. As described above, the client 20 may be the client 20 in the same electronic whiteboard 2, or the client 20 in the external electronic whiteboard 2 that is communicable via the first communication network 9a.

The communication controller 81 of the client 80, which may be implemented by the instructions of the CPU 201 or 801, and the network controller 205 or the network I/F 811, controls communication with the communication controller 81 of the client 80 in the external electronic whiteboard 2, or the communication controller 51 of the management system 50.

The display controller 82 of the client 80 is implemented by the instructions from the CPU 801, which is generated The pass code, which is generated, is stored in the memory 2000. The user at the electronic whiteboard 2a, who now knows the connection data, informs the other users at the electronic whiteboards 2b and 2c of that connection data through telephone or electronic mail.

As the user at the electronic whiteboard 2b turns on the power switch 226, the communication application A11 is activated to start processing of the client 20 in the electronic whiteboard 2b (S4). Similarly, as the user at the electronic whiteboard 2c turns on the power switch 226, the communication application A11 is activated to start processing of the client 20 in the electronic whiteboard 2c (S5). In response to a user input to the display 3b that requests connection, the communication controller 21 of the client 20 in the electronic whiteboard 2b transmits a participation request, with the pass code, to the communication controller 91 of the server 90 in the electronic whiteboard 2a (S6). Similarly, the electronic whiteboard 2c transmits a participation request, with the pass code, to the electronic whiteboard 2a (S7). The communication controller 91 of the electronic whiteboard 2a receives the participation requests (with the pass code), respectively, from the electronic whiteboards 2b and 2c.

Next, the communication controller 91 authenticates the electronic whiteboards 2b and 2c, based on a match between the pass codes that are received from the electronic whiteboards 2b and 2c, and the pass code stored in the memory 2000 (S8). The communication controller 91 transmits authentication results to the clients 90 of the electronic whiteboards 2b and 2c (S9, S10). When the authentication result indicates that the electronic whiteboards 2b and 2c are authenticated, the electronic whiteboard 2a that operates as the host terminal establishes a communication, respectively, with the electronic whiteboard 2b and electronic whiteboard 2c that operate as participant terminals (S11, S12). In the following, it is assumed that content data transmitted among the electronic whiteboards 2a, 2b, and 2c include stroke data.

Figure 9:
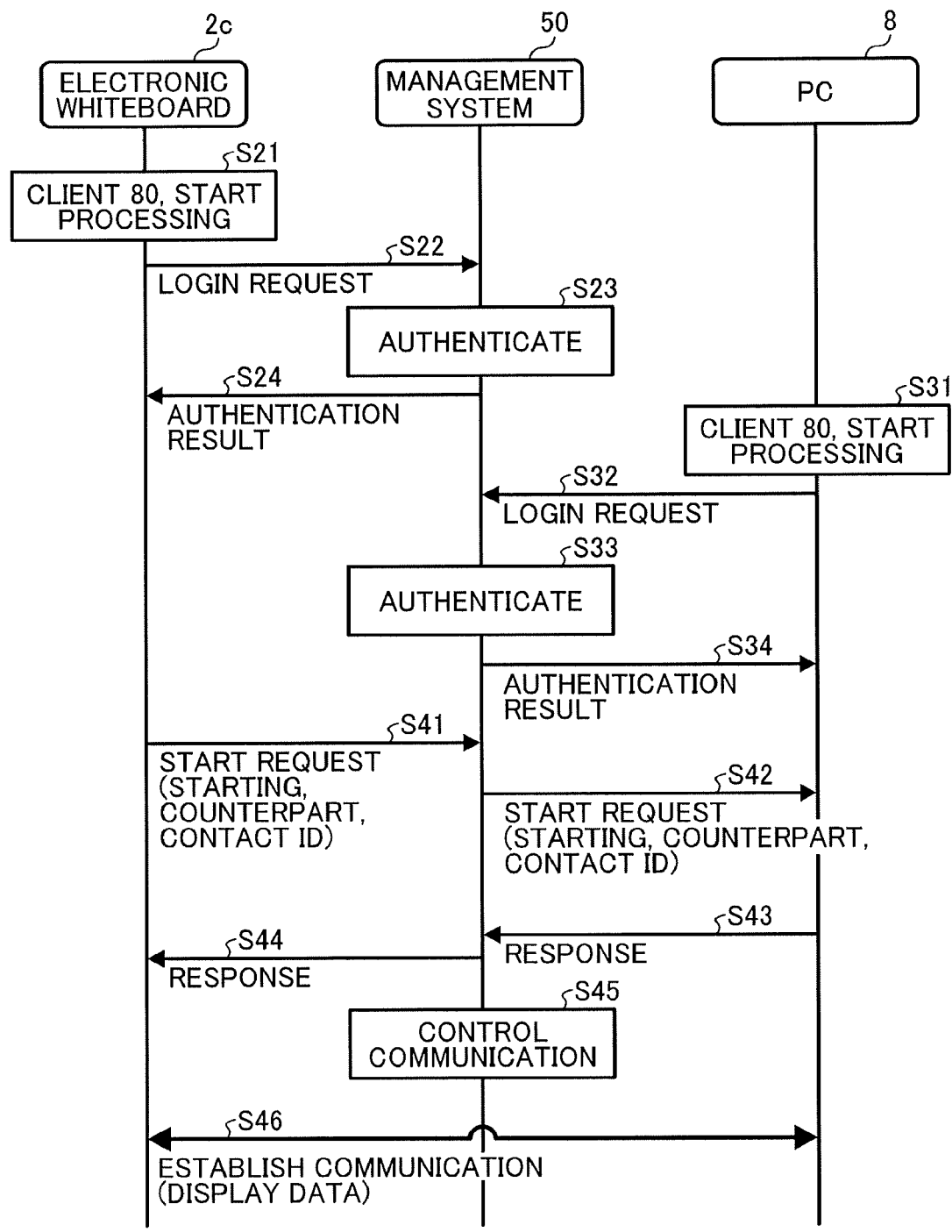
FIG. 9 is a data sequence diagram illustrating operation of establishing communication between the electronic whiteboard and the PC of FIG. 1, according to an embodiment of the present invention.

Referring to FIG. 9, operation of establishing communication between the electronic whiteboard 2c and the PC 8, with the communication applications B10 and B11, is described according to an embodiment.

Figure 13A:
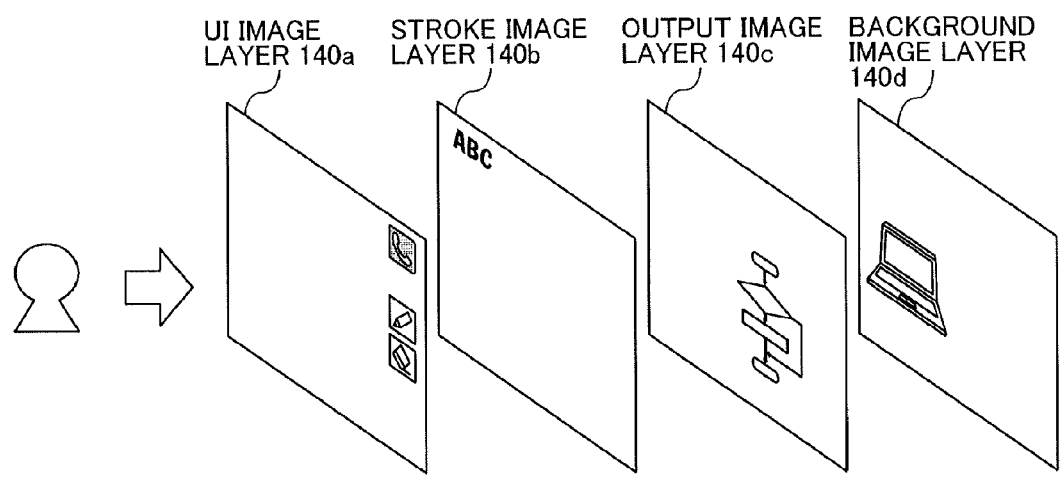
FIG. 13A is an example of combined image having image layers superimposed one above the other.
Figure 13B:
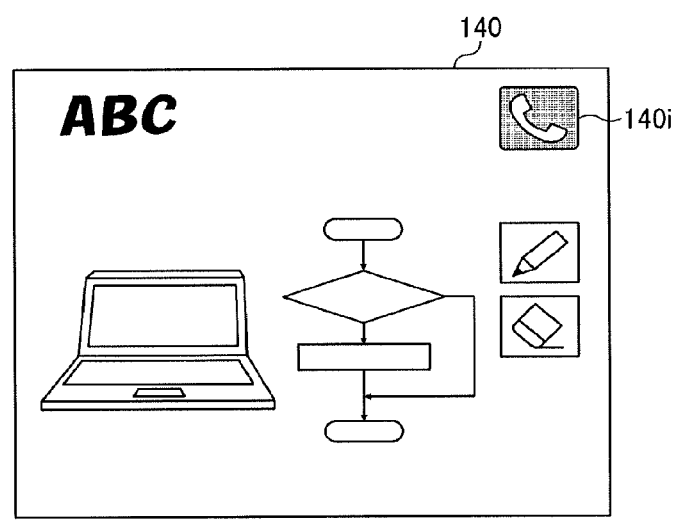
FIG. 13B is an example of combined image displayed at the electronic whiteboard or the PC.

In response to a user input to the display 3c that requests activation, the client 20 of the electronic whiteboard 2c activates the communication application B10 to start processing by the client 80 (S21). FIG. 13B is an example screen 140 to be shared, displayed at the electronic whiteboard 2c. As illustrated in FIG. 13B, the drawing controller 20 of the client 20 in the electronic whiteboard 2c displays, as a part of the screen 140 that accepts drawing from the user, an icon 140i to be selected for activating the communication application B10. In response to a user selection of the icon 140i, the client 20 of the electronic whiteboard 2c activates the communication application B10 to start processing by the client 80.

The communication controller 81 of the client 80 transmits a login request to the management system 50 through the second communication network 9b (S22). The management system 50 receives the login request.

The management system 50 authenticates the electronic whiteboard 2c that requests for log in (S23). The management system 50 transmits an authentication result to the electronic whiteboard 2c (S24). The communication controller 81 of the electronic whiteboard 2c receives the authentication result. In the following, it is assumed that the authentication result indicates that the electronic whiteboard 2c is allowed for log in.

As the PC 8 receives a request for activating the communication application B11, by a user input through the keyboard 821 or the mouse 822, the communication application B11 is activated to start processing by the client 80 of the PC 8 (S31).

The communication controller 81 of the client 80 transmits a login request to the management system 50 through the second communication network 9b (S32). The management system 50 receives the login request.

The management system 50 authenticates the PC 8 that requests for log in (S33). The management system 50 transmits an authentication result to the PC 8 (S34). In the following, it is assumed that the authentication result indicates that the PC 8 is allowed for log in.

In response to the user input to the display 3, the communication controller 81 of the electronic whiteboard 2c transmits a request for starting communication (S41). The communication start request includes a contact ID for identifying the electronic whiteboard 2c that sends the communication start request, and a contact ID for identifying the PC 8 as a communication destination. The management system 50 receives the communication start request. The contact ID is any information that identifies a communication destination, which includes identification information identifying the communication terminal such as a terminal ID, and identification information identifying a user operating the communication terminal such as a user account.

The management system 50 transmits a communication start request to the PC 8 (S42). The communication start request includes the contact ID for identifying the electronic whiteboard 2c as the communication start requester, and the contact ID for identifying the PC 8 as the communication destination, which are transmitted at S41. The PC 8 receives the communication start request.

The communication controller 81 of the PC 8 transmits a response to the communication start request, to the management system 50 (S43). In the following, it is assumed that the PC 8 transmits a response indicating to accept the communication start request, to the management system 50.

The management system 50 receives the response indicating to accept the communication start request. The management system 50 transmits, to the electronic whiteboard 2c that is the communication start requester, the response that is received from the PC 8 at S43 (S44). The communication controller 81 of the electronic whiteboard 2c receives the response accepting the communication start request.

The management system 50 establishes a communication session between the electronic whiteboard 2c and the PC 8, through the second communication network 9b, to transmit or receive content data (S45). The content data may be shared in various ways. For example, the management system 50 may set a specific destination that can be accessed by the electronic whiteboard 2c and the PC 8, which are authorized, to share content data. The destination for access may be set, within the management system 50 or any communication terminal other than the management system 50. The electronic whiteboard 2c and the PC 8 may each store content data to be shared at the specific destination, or obtain content data to be shared from the specific destination.

Figure 10:
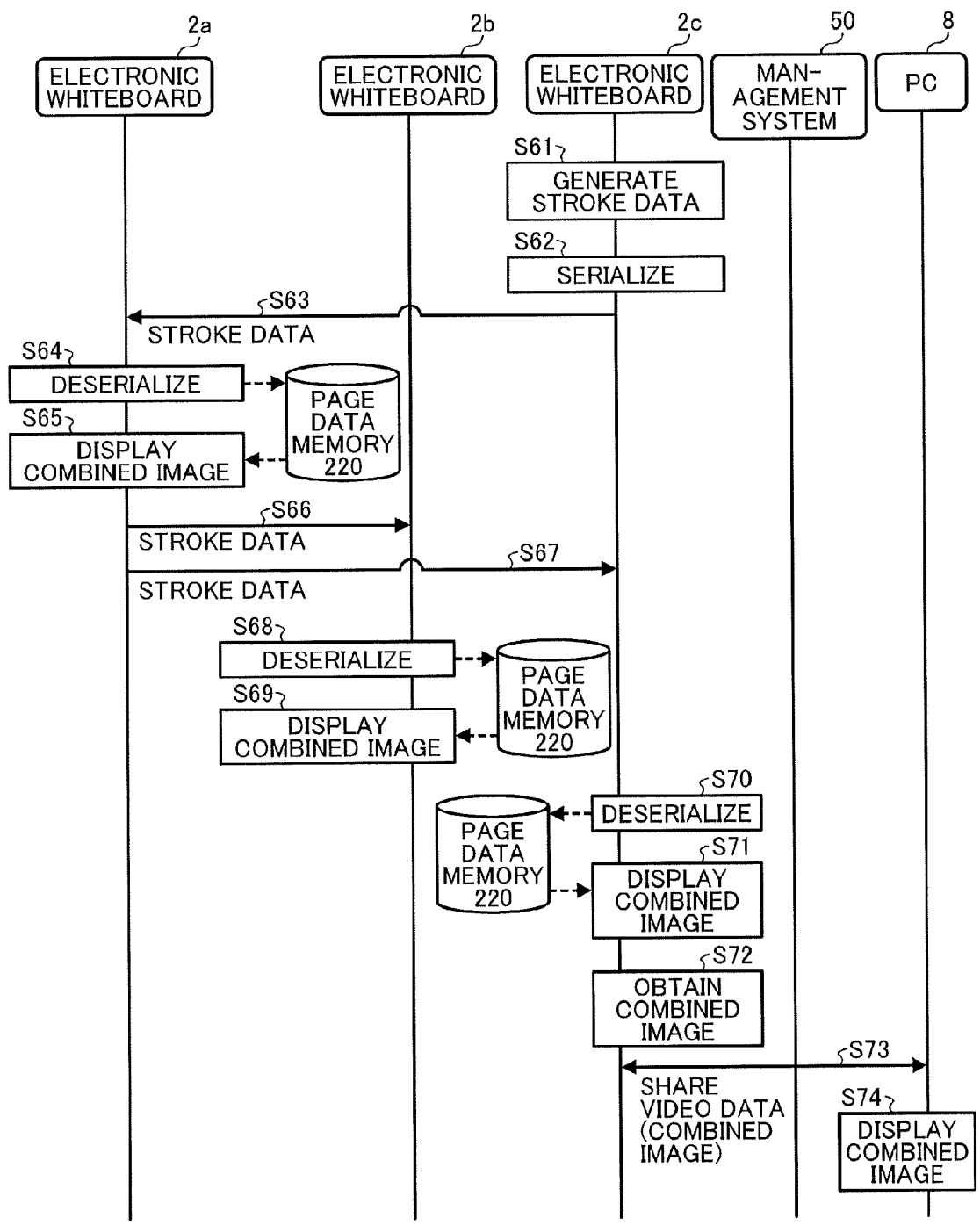
FIG. 10 is a data sequence diagram illustrating operation of processing various image data for output through the electronic whiteboards, in response to detection of a stroke drawing, according to an embodiment of the present invention.

Through the established communication session, the electronic whiteboard 2c and the PC 8 can exchange content data (S46). In this embodiment, the content data to be transmitted between the electronic whiteboard 2c and the PC 8 includes display data, such as display data to be used for videoconference, which may be a video image or a still image, and stroke data such as a drawing image drawn by the user at the electronic whiteboard 2. Referring to FIG. 10, operation of outputting an image to be shared among the electronic whiteboards 2 is described according to an embodiment.

As the user at the electronic whiteboard 2c draws a stroke image on the electronic whiteboard 2c with the electronic pen 4c, the stroke processor 22A generates stroke data based on the coordinate indicating the contact portion on the display 3c with the electronic pen 4c (S61). The stroke data includes a plurality of parameters as described referring to Table 2. The converter 22X groups a plurality of items of stroke data each reflecting one stroke drawing, and serializes the group of stroke data (S62). The communication controller 21 of the electronic whiteboard 2c transmits the serialized stroke data to the communication controller 91 of the electronic whiteboard 2a that is the host terminal, through the first communication network 9a (S63). The electronic whiteboard 2c may transmit stroke data reflecting one stroke drawing, one stroke drawing by one stroke drawing, to the electronic whiteboard 2a as the host terminal, as the stroke drawing is detected. For example, in case the user draws the alphabet "T", the electronic whiteboard 2c may transmit two items of stroke data, one drawing by one drawing.

As the serialized stroked data is received from the electronic whiteboard 2c, the communication controller 91 of the electronic whiteboard 2a transmits the received serialized stroke data to the client 20 of the electronic whiteboard 2a. The communication controller 21 of the client 20 in the electronic whiteboard 2a then receives the transmitted serialized stroke data. The converter 22X of the drawing controller 22 of the client 20 de-serializes the serialized stroke data (S64). The page processor 22Z stores the de-serialized stroke data in the page data memory 220, as newly-obtained stroke data to be added to previously stored stroke data. The combiner 22Y generates a stroke image, that is, a group of stroke drawings, based on the stroke data stored in the page data memory 220. The combiner 22Y further generates an output image, by combining items of object data stored in the page data memory 220. The combiner 22Y combines the generated output image, the generated stroke image, a user interface (UI) image, and a background image stored in the page data memory 220, to generate a combined image having four layers superimposed one above the other. The UI image may be previously stored in the page data memory 220. The combiner 22Y transmits the combined image to the display 3a for display at the display 3a (S65). FIG. 13A is an example of combined image having four image layers superimposed one above the other, and FIG. 13B is an example of combined image when displayed on a screen. As illustrated in FIG. 13A, the UI image layer 140a, the stroke image layer 140b, the output image layer 140c, and the background image layer 140d are superimposed one above the other to be displayed as a combined image.

Referring back to FIG. 10, the communication controller 91 of the electronic whiteboard 2a transmits the serialized stroke data, transmitted from the electronic whiteboard 2c, to the clients 20 of the electronic whiteboards 2b and 2c, respectively (S66, S67). The communication controller 21 of the client 20 in each one of the electronic whiteboards 2b and 2c receives the transmitted stroke data. The client 20 in each of the electronic whiteboards 2b and 2c causes each one of the displays 3b and 3c to display the combined image, which includes the stroke image transmitted from the electronic whiteboard 2a. Since this operation is substantially similar to the operation described above referring to S64 to S65 for the case of the client 20 of the electronic whiteboard 2a, description thereof is omitted (S68 to S71).

The communication controller 81 of the client 80 in the electronic whiteboard 2c obtains the combined image, which is transmitted from the combiner 22Y to the display 3c at S71 (S72). The combined image may be obtained at any desired time, such as every time the combined image is generated based on the stroke image being received at S67, or every predetermined time. The communication controller 81 of the electronic whiteboard 2c transmits the obtained combined image, as frame data of display data to the management system 50, through the communication session established between the communication controller 81 of the electronic whiteboard 2c and the communication controller 51 of the management system 50. As the display data is received from the electronic whiteboard 2c, the communication controller 51 of the management system 50 stores the received display data in the memory 5000. The communication controller 81 of the PC 8 obtains the display data from the management system 50, through the communication session established between the communication controller 81 of the PC 8 and the communication controller 51 of the management system 50. Accordingly, the electronic whiteboard 2c and the PC 8 share the display data (S73).

The display controller 82 of the client 80 in the PC 8 displays the obtained display data, on the display 820 (S74).

As described above, the electronic whiteboard 2 transmits the stroke data, for example, by one stroke by one stroke, as one stroke drawing is detected, to the counterpart electronic whiteboard 2 capable of processing stroke data for processing (S63, S66). The counterpart electronic whiteboard 2 stores the received stroke data in addition to previously stored stroke data, and generates a stroke image based on the accumulated items of stroke data. In case of transmitting the stroke data to the management system 50, the electronic whiteboard 2 transmits the combined image to the management system 50 (S73), after the combined image is generated for display (S71). Accordingly, the management system 50, which is not capable of processing stroke data, is able to store the combined image including the stroke image, for example, for transmission to any desired apparatus that requests for sharing of image. The management system 50 transmits the combined image including the stroke image to the PC 8 for display at the PC 8, which is not capable of processing the stroke data.

For example, referring to Table 2, the electronic whiteboard 2 may transmit, to the counterpart electronic whiteboard 2, one item of stroke data identified with the stroke data ID s001, which is a group of points as illustrated in Table 3. The counterpart electronic whiteboard 2 stores the received stroke data together with previously stored stroke data for display as a stroke image. In case of transmitting to the management system 50, the electronic whiteboard 2 generates a stroke image based on the stroke arrangement data, which includes a plurality of strokes for one character, for example, and transmits the stroke image to the management system 50 as a part of the combined image.

In the above-described example, it is assumed that the stroke image is generated based on drawing at the electronic whiteboard 2c. In case the stroke image is generated based on drawing at the electronic whiteboard 2a or 2b, operation is performed in a substantially similar manner as described above referring to S61 to S74, except that operation is performed by the client 20 at the electronic whiteboard 2a or 2b.

The above-described operation of controlling display of display data may be performed in various other ways. The following describes some modified examples. The electronic whiteboard 2 may be configured such that it is capable of performing operation, according to any one of the above-described example and the following modified examples.

Figure 11:
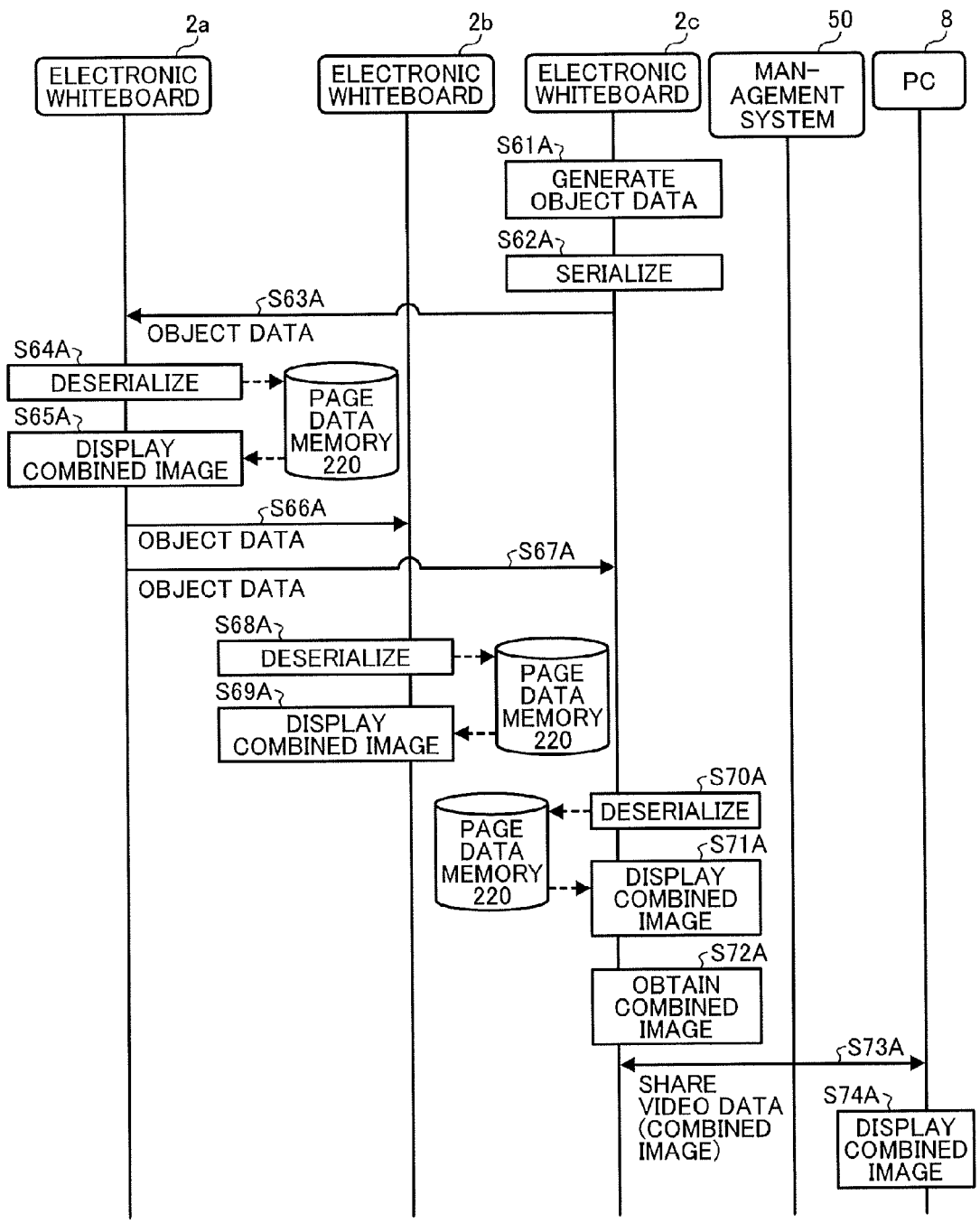
FIG. 11 is a data sequence diagram illustrating operation of processing various image data for output through the electronic whiteboards, in response to detection of an object drawing, according to an embodiment of the present invention.

In the modified example referring to FIG. 11, the electronic whiteboard 2c receives a request for adding or deleting an object. Examples of the object data include, but not limited to, information indicating a type of figure such as line, circle, polygon, arrow, etc., and information indicating a location of a side, center, or vertex of the figure, or any other information that may be utilized in drawing a specific object. For example, as illustrated in FIG. 13B, the user is able to draw a flowchart using the objects, which may be selected from a menu that may be displayed on the electronic whiteboard 2c.

As the user at the electronic whiteboard 2c adds an object on the electronic whiteboard 2c with the electronic pen 4c, the stroke processor 22A generates object data based on the coordinate indicating the contact portion on the display 3b with the electronic pen 4b (S61A).

The converter 22X serializes the object data (S62A) into a sequence of bytes. The communication controller 21 of the electronic whiteboard 2c transmits the serialized object data to the communication controller 91 of the electronic whiteboard 2a that is the host terminal (S63A).

As the object data is received from the electronic whiteboard 2c, the communication controller 91 of the electronic whiteboard 2a transmits the received object data to the client 20 of the electronic whiteboard 2a. The communication controller 21 of the client 20 in the electronic whiteboard 2a receives the serialized object data. The converter 22X of the drawing controller 22 of the client 20 de-serializes the serialized object data (S64A). The page processor 22Z stores the de-serialized object data in the page data memory 220, as newly obtained object data to be added to previously stored object data. The combiner 22Y generates an output image, by combining the items of object data stored in the page data memory 220. The combiner 22Y further generates a stroke image, that is, a group of strokes, based on the stroke data stored in the page data memory 220. The combiner 22Y combines the generated output image, the generated stroke image, a user interface (UI) image, and a background image stored in the page data memory 220, to generate a combined image having four layers superimposed one above the other. The UI image may be previously stored in the page data memory 220. The combiner 22Y transmits the combined image to the display 3a for display at the display 3a (S65A). The combined image may be an image having a plurality of image layers being superimposed one above the other as illustrated in FIG. 13A, which may be displayed as one image as illustrated in FIG. 13B.

Since S66A to S74A are performed in a substantially similar manner as described above referring to S66 to S74, except that data to be processed is object data in alternative to stroke data, description thereof is omitted.

In the above-described example, it is assumed that the object image is generated at the electronic whiteboard 2c. In case the object image is generated at the electronic whiteboard 2a or 2b, operation is performed in a substantially similar manner as described above referring to S61A to S74A, except that operation is performed by the client 20 at the electronic whiteboard 2a or 2b.

Figure 12:
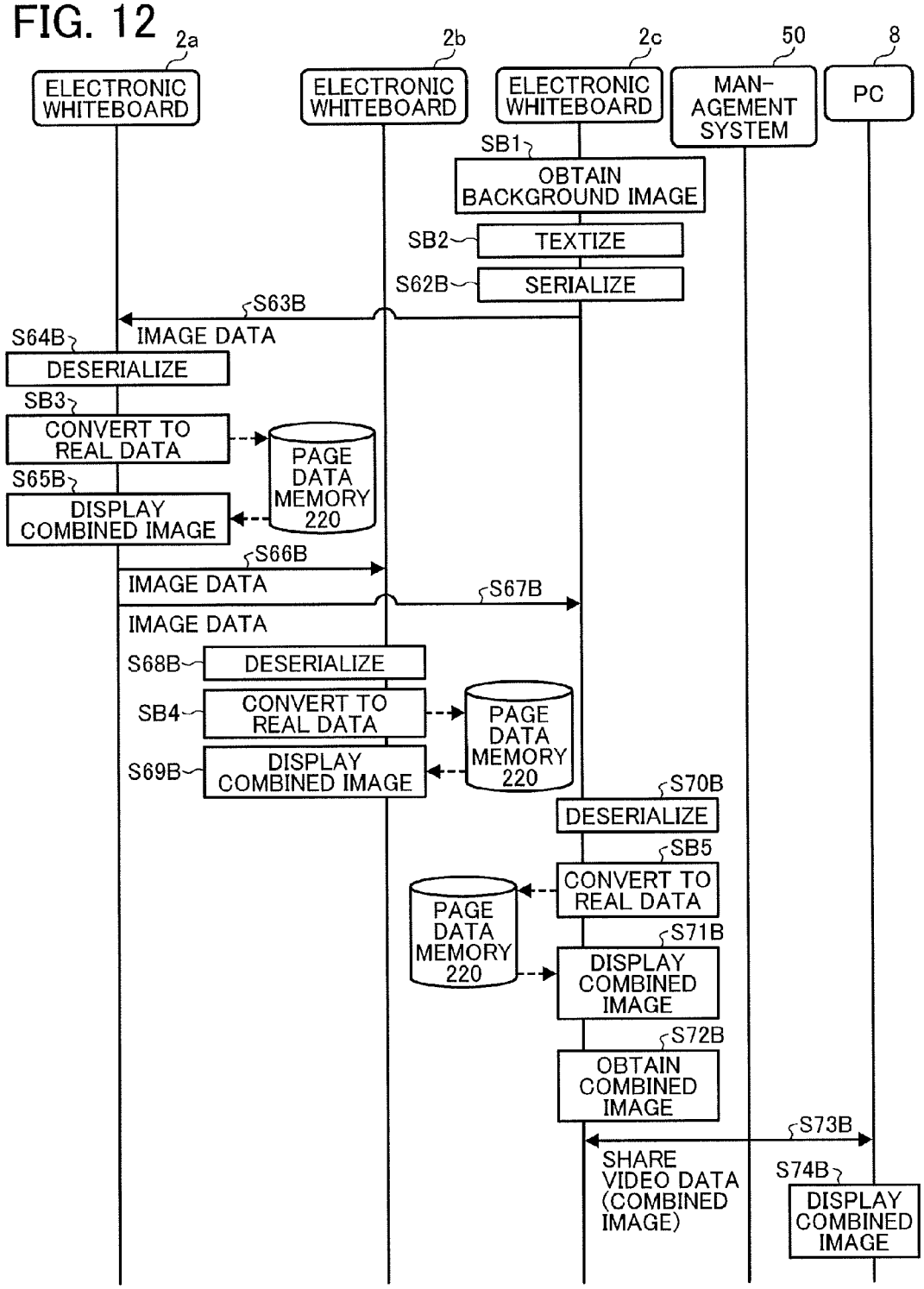
FIG. 12 is a data sequence diagram illustrating operation of processing various image data for output through the electronic whiteboards, in response to a request for changing a background image, according to an embodiment of the present invention.

Referring now to FIG. 12, another modified example is described. In this modified example, the electronic whiteboard 2c receives a request for changing (adding or deleting) a background image. Examples of such request for changing the background image include, but not limited to, a request for obtaining a new background image to be replaced with the currently-displayed background image.

As the user at the electronic whiteboard 2c requests to obtain an image being displayed at the PC 8 as an external device, with the electronic pen 4c, the electronic whiteboard 2c obtains the image being displayed at the note PC 8 as a background image (SB1). The converter 22X of the electronic whiteboard 2c textizes the obtained image data (SB2). Through this operation, the obtained image data as the background image, is converted to text data, which is the same format as that of the stroke data and the object data. The converter 22X of the electronic whiteboard 2c serializes the image data, which is the text data (S62B). The communication controller 21 of the electronic whiteboard 2c transmits the serialized image data, to the communication controller 91 of the electronic whiteboard 2a that is the host terminal (S63B).

As the image data is received from the electronic whiteboard 2c, the communication controller 91 of the electronic whiteboard 2a transmits the received image data to the client 20 of the electronic whiteboard 2a. The communication controller 21 of the client 20 in the electronic whiteboard 2a then receives the transmitted image data. The converter 22X of the drawing controller 22 of the client 20 de-serializes the image data (S64B). The converter 22X of the drawing controller 22 of the client 20 converts the image data, which is the text data, to real data (SB3).

The page processor 22Z, which may be implemented by the instructions of the CPU 201, stores the image data, which is the real data, in the page data memory 220 of the memory 2000, as medium data (Table 4). The combiner 22Y generates a stroke image, that is, a group of stroke drawings, based on the stroke data stored in the page data memory 220. The combiner 22Y further generates an output image, by combining items of object data stored in the page data memory 220. The combiner 22Y combines the generated output image, the generated stroke image, a user interface (UI) image, and the background image stored in the page data memory 220, to generate a combined image having four layers superimposed one above the other. The UI image may be previously stored in the page data memory 220. The combiner 22Y transmits the combined image to the display 3a for display at the display 3a (S65B). The combined image may be an image having a plurality of image layers being superimposed one above the other as illustrated in FIG. 13A, which may be displayed as one image as illustrated in FIG. 13B.

Referring back to FIG. 12, the communication controller 91 of the electronic whiteboard 2a transmits the serialized image data, transmitted from the electronic whiteboard 2c, to the clients 20 of the electronic whiteboards 2b and 2c, respectively (S66B, S67B). The communication controller 21 of the client 20 in the electronic whiteboards 2b and 2c each receive the transmitted image data. The client 20 in each of the electronic whiteboards 2b and 2c causes each one of the displays 3b and 3c to display the combined image, which includes the background image transmitted from the electronic whiteboard 2a. Since this operation is substantially similar to the operation described above referring to S64B, SB3, and S65B for the case of the client 20 of the electronic whiteboard 2a, description thereof is omitted (S68B, SB4, S69B, S70B, SB5, and S71B).

Further, operation of sharing the combined image between the electronic whiteboard 2c and the PC 8 is substantially similar as described above referring to S73 and S74, description thereof is omitted (S73B, S74B).

In the above-described example, it is assumed that the background image is obtained at the electronic whiteboard 2c. In case the background image is obtained at the electronic whiteboard 2a or 2b, operation is performed in a substantially similar manner as described above referring to SB1 to S74B, except that operation is performed by the client 20 at the electronic whiteboard 2a or 2b.

Further, the combined image to be displayed is not limited to the image illustrated in FIG. 13A. For example, the stroke image layer and the output image layer may be displayed in an order different that the order illustrated in FIG. 13A.

As described above, in one embodiment, the electronic whiteboard 2 communicates with the counterpart electronic whiteboard 2 capable of processing stroke data, and the management system 50 not capable of processing stroke data. The electronic whiteboard 2 stores, in the data memory 220, a plurality of items of stroke data each reflecting a stroke drawing made by the user at the electronic whiteboard 2. The electronic whiteboard 2 transmits the stroke data to the counterpart electronic whiteboard 2, for example, as one stroke drawing is detected. The electronic whiteboard 2 generates a stroke image based on the stroke data accumulated in the memory 220, and further transmits a combined image including the stroke image to the management system 50. Accordingly, the electronic whiteboard 2 is able to share the stroke image with the management system 50, even when the management system 50 is not provided with a function of processing stroke data. Using the combined image received from the electronic whiteboard 2, the management system 50 is able to further transmit such combined image to any other apparatus.

In one embodiment, the electronic whiteboard 2 stores, in the data memory 220, object data that may be input by the user at the electronic whiteboard 2. The electronic whiteboard 2 transmits the object data to the counterpart electronic whiteboard 2, for example, as one object is detected. The electronic whiteboard 2 generates a stroke image based on the stroke data accumulated in the memory 220, and an output image superimposed with an object image generated based on the stored object data. The electronic whiteboard 2 further transmits a combined image including the stroke image and the output image to the management system 50. Accordingly, the electronic whiteboard 2 is able to share the object image with the management system 50, even when the management system 50 is not provided with a function of processing object data.

In one embodiment, the electronic whiteboard 2 obtains a background image from an external apparatus such as a PC, and stores the background image in the page data memory 220, in response to a user instruction. The electronic whiteboard 2 transmits the obtained background image to the counterpart electronic whiteboard 2. The electronic whiteboard 2 generates a stroke image based on the stroke data accumulated in the memory 220, and generates a combined image including the stroke image and the stored background image for transmission to the management system 50. Accordingly, the electronic whiteboard 2 is able to share the object image with the management system 50, even when the management system 50 is not provided with a function of managing a background image.

In addition to the stroke image, output image that may include the object image, and background image, the electronic whiteboard 2 may store the UI image. The UI image may be transmitted to the management system 50, as a part of the combined image.

The management system 50 further transmits the combined image, which is transmitted from the electronic whiteboard 2, to the PC 8. Accordingly, even when the PC 8 is not capable of processing stroke data, the PC 8 is able to share the combined image including the stroke image with the electronic whiteboard 2.

The communication applications A11, B10, and B11 may each be recorded in a file in a format installable or executable on a computer-readable recording medium for distribution. Examples of such recording medium include, but not limited to, compact disc-recordable (CD-R), digital versatile disc (DVD), and blue-ray disc. In addition, a memory storing any one of the above-described control programs, such as a recording medium including a CD-ROM or a HDD, may be provided in the form of a program product to users within a certain country or outside that country.

Any one of the electronic whiteboard 2, the PC 8, the relay device 30, and the management system 50 may be implemented as a single apparatus or a plurality of apparatuses to which divided portions (functions) are allocated. In the above-described embodiments, the electronic whiteboards 2 and the PC 8 are described as examples of apparatus capable of sharing images, however, any other apparatus can be used to share images. Examples of such apparatuses include, but not limited to, videoconference terminal, projector, digital signage, text sharing device, car navigation system, game machine, personal digital assistant (PDA), and remote diagnosis system.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication terminal, comprising:
a circuitry configured to:
display an image being shared with a first communication terminal and a second communication terminal, the image having a plurality of image layers superimposed one above another, and the plurality of image layers including a first image layer, a background image layer and a user interface layer, the background image layer for displaying a background image behind the first image layer and the user interface layer for displaying a user interface image above the first image layer;
store, in response to a user input for changing appearance of the first image layer of the image, information reflecting the change caused by the user input to the first image layer in a memory;
store the user interface image in the memory;
retrieve, in response to a user request for replacing the background image with a different background image, the different background image; and
generate, based on the information and the different background image, an updated image having the user interface layer superimposed on the first image layer and the first image layer being superimposed on the different background image, the first image layer reflecting the change caused by the user input; and
a transmitter configured to:
transmit the information, the user interface image and the different background image to the first communication terminal to cause the first communication terminal to generate and display the updated image having the user interface layer superimposed on the first image layer and the user interface layer superimposed on the different background image; and
transmit the updated image, having the user interface layer superimposed on the first image layer and the user interface layer superimposed on the different background image, to the second communication terminal to cause the second communication terminal to store the updated image.

2. The communication terminal of claim 1, wherein the first image layer is a stroke image layer for displaying a stroke image that reflects a series of stroke drawings made by the user.

3. The communication terminal of claim 2, wherein the first image layer further includes an output image layer for displaying an output image, the output image having an object image that reflects an object input by the user.

4. The communication terminal of claim 2, wherein the stroke image is a video image.

5. The communication terminal of claim 2, wherein the first communication terminal is capable of generating the stroke image, and the second communication terminal is not capable of generating the stroke image.

6. The communication terminal of claim 5, wherein the second communication terminal is a communication management server that transmits the updated image to a third communication terminal, the third communication terminal not capable of generating the stroke image.

7. The communication terminal of claim 1, further comprising a display configured to display the updated image.

8. A communication system, comprising:
the communication terminal of claim 1;
the first communication terminal that communicates with the communication terminal to share the image; and
the second communication terminal being a communication management server that controls communication among a plurality of communication terminals.

9. The communication system of claim 8, wherein
the plurality of communication terminals further includes a third communication terminal that requests sharing of the image with the communication terminal and the first communication terminal, and
the communication management server further transmits the updated image that is received from the communication terminal, to the third communication terminal to cause the third communication terminal to display the updated image.

10. A method of controlling sharing of an image, performed by a communication terminal, the method comprising:
displaying an image being shared with a first communication terminal and a second communication terminal, the image having a plurality of image layers superimposed one above another, and the plurality of image layers including a first image layer, a background image layer and a user interface layer, the background image layer for displaying a background image behind the first image layer and the user interface layer for displaying a user interface image above the first image layer;
storing, by a circuitry of the communication terminal and in response to a user input for changing appearance of the first image layer of the image, information reflecting the change caused by the user input to the first image layer in a memory;
storing the user interface image in the memory;
retrieving, by the circuitry in response to a user request for replacing the background image with a different background image, the different background image;
generating, by the circuitry based on the information and the different background image, an updated image having the user interface layer superimposed on the first image layer and the first image layer being superimposed on the different background image, the first image layer reflecting the change caused by the user input;
transmitting, by a transmitter of the communication terminal, the information, the user interface image and the different background image to the first communication terminal to cause the first communication terminal to generate and display the updated image having the user interface layer superimposed on the first image layer and the user interface layer superimposed on the different background image; and
transmitting, by the transmitter, the updated image, having the user interface layer superimposed on the first image layer and the user interface layer superimposed on the different background image, to the second communication terminal to cause the second communication terminal to store the updated image.

11. The method of claim 10, wherein the first image layer is a stroke image layer for displaying a stroke image that reflects a series of stroke drawings made by the user.

12. The method of claim 11, further comprising:
displaying the updated image having a user interface layer, the first image layer, and the background image that are superimposed one above the other.

13. The method of claim 11, wherein the first image layer further includes an output image layer for displaying an output image, the output image having an object image that reflects an object input by the user.

14. The method of claim 11, wherein the stroke image is a video image.

15. The method of claim 11, wherein the first communication terminal is capable of generating the stroke image, and the second communication terminal is not capable of generating the stroke image.

16. The method of claim 10, wherein the second communication terminal is a communication management server that transmits the updated image to a third communication terminal, the third communication terminal not capable of generating the stroke image.

17. A non-transitory recording medium which, when executed by one or more processors in a communication terminal, cause the one or more processors to perform a method of controlling sharing of an image, the method comprising:
displaying an image being shared with a first communication terminal and a second communication terminal, the image having a plurality of image layers superimposed one above another, and the plurality of image layers including a first image layer, a background image layer and a user interface layer, the background image layer for displaying a background image behind the first image layer and the user interface layer for displaying a user interface image above the first image layer;
storing, in response to a user input for changing appearance of the first image layer of the image, information reflecting the change caused by the user input to the first image layer in a memory;
storing the user interface image in the memory;
retrieving, in response to a user request for replacing the background image with a different background image, the different background image;
generating, based on the information and the different background image, an updated image having the user interface layer superimposed on the first image layer and the first image layer being superimposed on the different background image, the first image layer reflecting the change caused by the user input;
transmitting the information, the user interface image and the different background image to the first communication terminal to cause the first communication terminal to generate and display the updated image having the user interface layer superimposed on the first image layer and the user interface layer superimposed on the different background image; and transmitting the updated image, having the user interface layer superimposed on the first image layer and the user interface layer superimposed on the different background image, to the second communication terminal to cause the second communication terminal to store the updated image.

18. The non-transitory recording medium according to claim 17, wherein the first image layer is a stroke image layer for displaying a stroke image that reflects a series of stroke drawings made by the user.

* * * * *